United States Patent [19]

Post, Jr.

[11] Patent Number: 5,637,674

[45] Date of Patent: Jun. 10, 1997

[54] AUTOCATALYTIC GENERATION OF CHEMICAL COMPOUNDS

[76] Inventor: Robert L. Post, Jr., 4916 Kingston Dr., Annandale, Va. 22003

[21] Appl. No.: 233,528

[22] Filed: Apr. 26, 1994

[51] Int. Cl.⁶ .................................................. C08G 73/00
[52] U.S. Cl. .............................. 528/422; 422/67; 436/155
[58] Field of Search .............................. 422/67; 436/155; 528/422

[56] References Cited

U.S. PATENT DOCUMENTS 3,446,842  5/1969  Nozaki ..................................... 564/132
4,119,736  10/1978  Howland et al. ........................ 426/386

OTHER PUBLICATIONS

Post Jr., Robert L., The Origin of Homeostasis in the Early Earth, J. Mol. Evol. (1990) 31:257–264.

Primary Examiner—James J. Seidleck
Assistant Examiner—P. Hampton-Hightower
Attorney, Agent, or Firm—James Creighton Wray

[57] ABSTRACT

A method for the synthesis of complex organic compounds at high temperatures and internal pressures in a closed system, where autocatalytic activity is present.

20 Claims, 1 Drawing Sheet

AUTOCATALYTIC GENERATION OF CHEMICAL COMPOUNDS

BACKGROUND OF THE INVENTION

This invention relates to chemical synthesis.

In standard organic chemical synthesis it is necessary to specify the initial chemical species taking part in given reactions. The synthesis follows a pre-specified reaction path.

It is highly desirable to develop new methods of organic chemical synthesis not involving nucleic acids which are capable of readily generating a wide variety of reaction products which cannot be pre-specified in advance, thereby providing a new means of significantly expanding the existing "library" of known chemical compounds. Furthermore, it would be useful to develop a process which at the same time, generates products which depend only on the overall bulk stoichiometry of the initial chemical compounds, but not on the specific initial chemical compounds collectively resulting in that stoichiometry.

SUMMARY OF THE INVENTION

The present invention involves the synthesis of chemical compounds in closed systems at elevated temperatures and internal pressures, beginning with simple compounds such as water, methanol and ammonia, where upon attaining a critical thermodynamic state comprising a critical range of temperatures, confining pressures and stoichiometries, the chemical compounds in the said closed system at the said critical state collectively help catalyze their own formation through the process of autocatalysis. The compounds initially placed in the closed system must collectively have a bulk stoichiometry permitting the presence of organic polymers in the final chemical assemblage in the said closed system. The primary role of the high temperatures and pressures is to permit, under initial quasi-equilibrium conditions, the presence of organic molecules with sufficiently high concentrations and molecular weights to in turn permit the presence of a critical level of overall catalytic activity, including the presence of autocatalysis. In this patent application, autocatalysis does not involve the presence of self-replicating polymers such as nucleic acids; autocatalysis refers to the existence of at least one catalytic reaction chain permitting catalytic feedback in a feedback loop comprising one or more molecular species, permitting the species in the said catalytic feedback loop to collectively catalyze their own formation. The term autocatalysis is consistent with its general meaning as found in the scientific literature (e.g. see attached article published in the Journal of Molecular Evolution in 1990).

An unsolved problem in early chemical evolution in nature relates to the mechanism for initiation of self-sustaining autocatalytic reactions. In existing laboratory assemblages, autocatalysis has been achieved only with pre-existing complex organic molecules (e.g. nucleic acid monomers, RNA and/or replicase). The methodology and reaction process described herein enables the generation of numerous new compounds, including complex polymers, beginning with organic compounds no more complex than methanol.

The methodology described herein requires the initial presence of high temperatures and confining pressures (beyond the critical point of water); these temperature and pressure conditions permit the presence of organic compounds thermodynamically viable at those said temperature and pressure conditions (i.e. where such organic compounds are the products, at quasi-steady-state conditions, of chemical reactions among the said species present under said temperature and pressure conditions at a given bulk stoichiometry) where the said organic compounds at elevated temperature and pressure conditions are present in sufficient concentrations to trigger the onset of autocatalytic reactions among the said chemical compounds and subsequent significant increases in concentrations of a subset of the said compounds, resulting in final quasi-steady state conditions characterized by the continued presence of said autocatalytic activity.

This experimental process was initiated in a series of experiments. Samples from several of these experiments resulted in the presence of organic solids (e.g. polymers) consistent with the presence of autocatalysis as described above.

No real parallels to the above general autocatalytic process are found in the published scientific and technical literature. The attached (1990) scientific article discusses the feasibility of initiating autocatalysis under natural conditions at high temperatures and pressures in the early earth for varying initial stoichiometries but does not discuss the laboratory feasibility of such a process.

A fundamental limitation in the prior art of chemical synthesis of complexmolecules, especially polymers, is the necessity to specify the initial chemical species taking part in a given chemical reaction (e.g. nucleic acids and replicase compounds). In the general method of autocatalytic chemical synthesis described herein, both the beginning catalysts (stable at high temperatures and pressures) as well as final evolutionary products are automatically generated in a closed system, and require no initial specification, other than of the overall stoichiometry, which is expressed by the overall ratio of such elements as C, H, O and N in the initial compounds (C:H:O:N); the stoichiometry thus is not directly dependent on the specific chemical compositions of the chemical compounds initially present (before going to elevated temperature and pressure).

It is a principal object of the present invention to generate, through autocatalytic chemical reactions, a wide range of new chemical compounds that could be synthesized with difficulty, if at all, by existing methods of synthesis. Such new compounds would augment the existing library of known compounds available to organic chemists and biochemists, potentially enabling new commercial applications.

It is another object of the present invention to control the compounds synthesis by varying, in a systematic manner, a wide range of parameters comprising peak temperature and pressure, stoichiometry, rate of cooling from peak temperature, etc.

Many of the chemical species resulting from this methodology are the product of a self-sustaining autocatalytic system, which has the potential for continuing molecular evolution even over the short timeframes characterizing laboratory conditions. Accordingly, this methodology has the potential for resulting in progressively more complex molecular species through extended timeframes at temperature, as well as by varying external parameters, and by incorporating additional elements (in additional liquid and solid substances) comprising S, P, Ca, Na, Cl, etc.

The present invention is a new way of generating organic molecular species, many of which could not be readily generated using alternative techniques. It involves heating a mixture of chemical compounds possessing a range of stoichiometries (e.g. C:H:O:N: other elements, if present) at high temperatures and internal pressures in a sealed quartz pressure vessel. A wide range in stoichiometries can be achieved through initial mixtures comprising water, ammonia and methanol, but not requiring the use of these specific compounds. At various combinations of stoichiometry (e.g. approximately equal amounts of water, methanol and concentrated 30% ammonia solution) elevated temperature (as high as 950° C. or higher) and internal pressure (as high as 70 atmospheres or higher) there will be a sufficient (quasi steady-state) concentration and variety of organic molecular species (resulting from a wide variety of ongoing chemical reactions) that autocatalysis will result, leading to significantly elevated concentrations of organic molecular species acting as catalysts in one or more catalytic feedback loops. The preferred peak temperatures and peak confining pressures in the following detailed description exceed 700° C. and 50 atmospheres, but it is anticipated that autocatalysis could occur at significantly lower peak temperatures and confining pressures with appropriate initial stoichiometries and the presence of appropriate surface catalysts (e.g. silicates) in the pressure vessel.

The physical assembly in the patent is generally shown in the drawings attached. The physical assembly, procedure and chemical process comprising this invention includes:

A starting mixture of chemicals, at least one of which contains the element carbon, and which further comprises the elements H, O and N. (A representative starting mixture is methanol, water and concentrated ammonia solution, but any chemical mixture that has bulk stoichiometries consistent with the presence of organic polymers can be used.)

Placing of the mixture of simple chemical compounds in a vessel capable of withstanding both elevated temperatures and internal pressures, sealing of the vessel (with the beginning compounds inside) and heating of that vessel to elevated temperature, where the elevated internal pressure results from the existence of a gaseous phase for some or all of the resulting chemical constituents. While the inner vessel wall can in principle react to some extent (catalytically or non-catalytically) with the confined chemical species, and permit some degree of diffusion of atoms or molecules into the vessel from the interior of the vessel, the vessel must limit such processes to the extent of maintaining a substantial portion of the initial atoms in the vessel (as opposed to permitting substantial diffusion of atoms and/or molecules into and/or through the containment vessel or forming compounds with the inner vessel wall material and thus not being further available for reaction). The vessel materials, apart from the above general requirements, can in principle vary widely. A thick-walled quartz vessel was found to possess the necessary mechanical strength at high temperature, minimize chemical reactions with the reactants and minimize diffusion of the reactants into the vessel wall. However, other containment materials could be used for this purpose.

A combination of elevated temperature and confining pressure sufficient to result in an initial thermodynamically determined assemblage of chemicals that depends only on the initial bulk stoichiometry of the initial chemicals, but not on the specific chemicals initially used, to any significant extent. Furthermore, the temperature and confining pressure must be sufficient to allow high enough concentrations of a mixture of chemical species under these thermodynamic conditions to permit a critical level of autocatalysis resulting in significant growth in concentrations of a subset of molecular species with catalytic properties, resulting in a final assemblage whose composition has been significantly affected by said catalytic reactions. In existing runs, temperatures exceeding 700° C. and 50 atmospheres were sufficient to result in a solid reaction product in the pressure vessel indicating significant polymerization, and the presence of autocatalysis. However, these said thermodynamic conditions, while permitting the onset of autocatalysis, do not necessarily represent absolute minimum conditions of temperature and confining pressure for the onset of autocatalysis, owing to the potential range in stoichiometries and other initial conditions.

After a suitable time at elevated temperature, allowing the vessel and sealed contents to subsequently cool to room temperature, or alternatively, venting of the contents from the vessel at elevated temperature into a cooled receptacle.

The experimental procedures used include:

Fashioning of a thick-walled quartz tube into a vessel by fusing (thus sealing) one end, and drawing down the other end of the tube into a tip with a narrow opening approximately 0.5 mm in diameter (FIGS. 1 and 2) sufficient to admit a hypodermic needle and permit injection of initial chemicals in liquid form into the quartz vessel. Solid chemicals can be put into the tube prior to formation of the tip with narrow opening.

Annealing of above fashioned assembly (prior to insertion of liquid chemicals) to remove microfractures occurring during fabrication.

Inserting of desired chemicals (in liquid form) into pressure vessel through narrow opening using a hypodermic needle. Water, methanol and concentrated ammonia solution (30%) permit a very wide range in possible stoichiometries involving the elements C, H, O and N. Approximately equal amounts (about 0.05 ml) of distilled water, methanol and concentrated ammonia solution were used. A wider range in stoichiometries can be obtained by using hydrogen peroxide, graphite and/or organic compounds which are liquid at room temperature. A further broadening in the range of stoichiometries (e.g. additional elements) can be obtained through the insertion of other liquids (e.g. water with dissolved salts, acids and bases) along with the addition of solid chemicals in the pressure vessel. The solid chemicals (e.g. silicates) need not form chemical compounds with the liquids/gases in the pressure vessel, but can affect the final chemical assemblage by acting as surface catalysts.

Chilling of the open pressure vessel (containing inserted chemicals) through contact with carbon dioxide in solid form (dry ice).

Sealing of the pressure vessel by fusing the narrow opening described above; the above chilling of the vessel minimizes any loss of liquids during the brief highly localized heating required to fuse the opening at the open tip of the quartz vessel.

Placing of the sealed tube in a protective housing (e.g. stainless steel as shown in the attached figure) sufficient to contain the bulk of the vessel fragments in the event of a fracture in the quartz vessel at elevated temperature and pressure (sufficient to protect both the furnace and nearby personnel).

Heating of the sealed vessel with housing in an electric furnace. The attached FIGS. 1 and 2 show a movable sleeve holding a sample collection tube, with a break-seal pin passing through the moveable sleeve. This additional assembly is an optional feature, as further discussed below, and is not part of the core assembly (pressure vessel and housing only) that is heated in the furnace.

Cooling of the vessel and housing (after heating to high temperature) through means comprising:

slow cooling of the vessel in the electrical furnace as electrical power to the furnace is reduced and eliminated.

alternatively, more rapid cooling of the vessel by removal of the vessel and housing from the furnace at elevated temperature, and cooling of said pressure vessel in said housing through exposure to the atmosphere at room temperature.

alternatively, removal of the pressure vessel and surrounding housing from the furnace at elevated temperature (where the narrow fused tip protrudes outside the housing through a hole in the housing, as shown in FIG. 2) and placement of a chilled collection vessel (chilled by liquid nitrogen) adjacent to the hot stainless steel housing, where the collection is held in place by a moveable sleeve surrounding the collection vessel and sliding over the stainless steel housing. The tip of the fused seal is then broken by a movable break-seal pin passing through the movable sleeve, and the hot gaseous contents of the pressure vessel are vented into the chilled collecting vessel.

These and other objects and features of the invention are apparent in the disclosure, which includes the above and ongoing written specification, with the claims and the drawings.

DETAILED DESCRIPTION OF THE DRAWINGS

Figure 1:
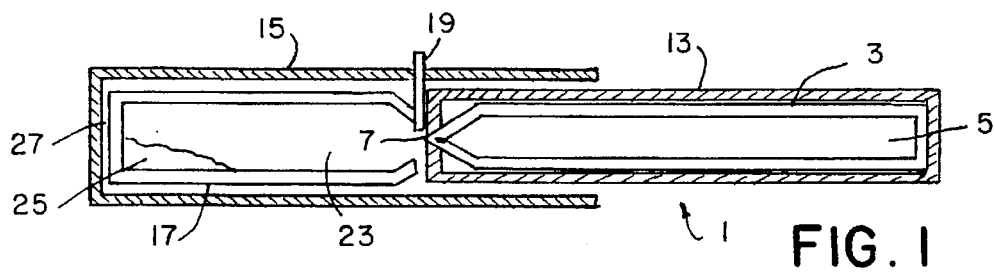
FIG. 1 is a schematic cross-sectional representation of apparatus for performing the present invention.

Referring to the drawings, a liquid sample consisting of a variable mixture comprising water, methanol and concentrated ammonia solution is heated in a closed vessel. Following heating in a furnace, the sample (in the closed vessel) is cooled either by remaining in the cooling furnace or by the closed vessel being removed from the furnace and allowed to cool at room temperature. Alternatively, cooling can be achieved by rapidly venting the superheated mixture of gases into a collecting vessel cooled by liquid nitrogen. The resulting precipitate and liquids (by whatever method of cooling) is then analyzed.

Figure 2:
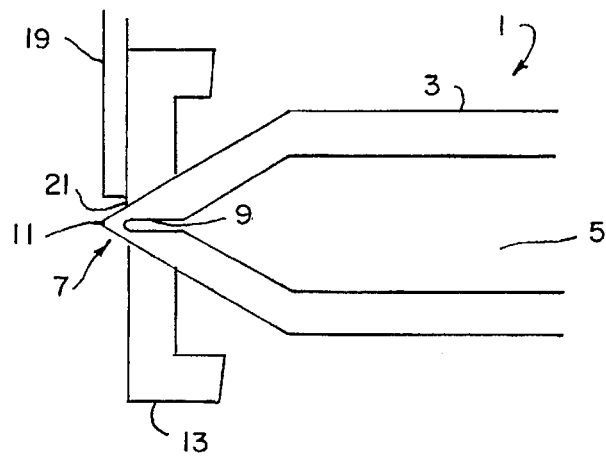
FIG. 2 is a detail of the apparatus shown in FIG. 1.

FIGS. 1 and 2 show a schematic representation of the experimental assembly 1. The fused quartz pressure vessel 3 containing the sample (about 15 cm long) is sufficiently thick-walled (3 mm) to accommodate internal pressures of a least 100 atmospheres at temperatures of 1000° C. and higher. No liquid phase will normally be present in the heated pressure vessel 3, since temperatures will normally well exceed that of the critical point of water. The venting seal 7, prior to the run, is initially open, with an approximately 0.5 mm (or smaller) opening 9. The liquid sample 5 is put into the vessel through this opening 9 by a syringe, and the opening 9 is subsequently sealed by fusing 11. The detail of the fused tip is shown in FIG. 2.

In the sample assembly 1 shown in FIG. 1, walls of the housing 13 and movable sleeve 15 are ⅛ inch thick. The housing and pressure vessel 3 are heated in an electrical furnace. Sleeve 15 with sample collection tube 17 are slipped over housing 13 at the time of sample collection if rapid venting is elected as a method of cooling of the sample material. The pressure vessel 3 is fused quartz about 15 cm long, with walls about 3 mm thick.

Details of fused seal are shown in FIG. 2. Break seal pin 19 breaks off the portion 21 of fused seal 7 protruding from the housing 13, thereby allowing the sample 5 to vent through the cleared 0.5 mm hole, if rapid venting is elected.

The sealed quartz vessel 3 is placed in the stainless steel housing 13 providing a more isothermal environment (along with physical protection in the case of a rupture of the pressure vessel) and is heated in an electric furnace. After reaching the desired final temperature, if rapid venting is elected, the stainless steel sleeve 15 containing the quartz collection tube 17 is slipped over the end of the housing with the projecting tip of the fused seal, as shown in FIG. 1. The fused seal tip 7 is then mechanically broken of by means of a blow on the pin 19 extending through the movable sleeve and impinging on the tip, as shown in FIG. 1.

The hot gaseous sample (5 and 23) then vents through the 0.5 mm opening 9 into the quartz collecting vessel, which is chilled by liquid nitrogen. The collection tube also internally has a small amount of liquid nitrogen 25 near the closed end 27. That provides a continuous flow of gaseous nitrogen out of the collecting vessel during venting, thereby preventing the presence of oxygen in the vessel and preventing oxidation of the gaseous sample before it precipitates on the chilled wall. The nitrogen outflow also prevents the addition of carbon dioxide and water to the precipitate from the atmosphere. This technique requires that the collecting tube be capped as soon as the sample is vented while some liquid nitrogen remains, to prevent the subsequent addition of external water and carbon dioxide to the precipitate.

Rapid cooling of the sample is useful in preserving the spectrum of compositions existing at elevated temperature. This is afforded both by the chilled wall of the collection tube and by the rapid expansion of the vented gases prior to precipitation on the wall. While this method avoids additional chemical reactions associated with slower cooling in the pressure vessel, it may result in some reaction of gases with the nitrogen atmosphere (and possible residual presence of oxygen) and partial loss of some of the more volatile compounds due to incomplete precipitation on the chilled wall of the collection tube.

Gradual cooling of the contained sample to room temperature, while resulting in some further alteration in chemical compositions, also allows all of the contents to be recovered, permits autocatalysis to proceed for some additional time at a declining temperature, and provides a mechanism for potentially generating additional compounds (along with potential loss of some compounds present only at the peak temperature).

The use of water, methanol and concentrated ammonia solution achieves a wide range in stoichiometric ratios of carbon, hydrogen, oxygen and nitrogen that could have been alternatively achieved by a sample containing gases such as methane, carbon dioxide, hydrogen, oxygen and nitrogen. The reason for using the first group of compounds in the methodology is that they are all liquids, facilitating ease of placement in the pressure vessel at room temperature and pressure. At sufficiently high temperatures (above several hundred degrees C) strict dynamic chemical equilibrium between all molecular species will be obtained in relatively short time frames (several hours or less) meaning that by definition, this chemical equilibrium will depend only on the stoichiometric ratios C:H:O:N (and the absolute concentration of these elements) and not on the specific chemical compositions of the compounds in the beginning sample.

There are numerous parameters that can be varied in such a way as to influence the composition of the final chemical assemblage:

- detailed temperature history, comprising peak temperature, time to temperature, time at peak temperature, rate of cooling to room temperature, and temperature recycling (if any). For example, it is conceivable that the composition of the final assemblage might be influenced by temporarily pre-heating to a higher temperature than the principal temperature, owing to the non-linear effects accompanying autocatalysis.
- internal pressure, primarily determined by the initial volume of liquid in the sealed pressure vessel and the temperature.
- stoichiometry of initial chemical assemblage in sealed pressure vessel.
- initial chemical composition of liquids and gases in the sealed pressure vessel.
- presence of solids (e.g. graphite, iron) in the sealed pressure vessel which can affect oxygen fugacity.
- presence of solids in the sealed pressure vessel affecting general chemical reactions at pressure and temperature in the vessel through surface catalysis, and through chemical reactions with compounds initially in liquid and gaseous state at initial room conditions.
- presence of a wide variety of additional elements as introduced through solutions including dissolved salts, acids and bases.
- use of different materials for the inner surface of the pressure vessel, affecting the chemical reactions through surface catalysis, longer duration chemical bonding, and through selective diffusion of chemical and atomic species into the pressure vessel.
- recovery of product from a given sample run, and use as initial material, along with added chemicals, in subsequent sample runs.
- external electrical fields.

While salts can be dissolved in the liquid sample, materials such as clays and silicates will need to be placed in the quartz pressure vessel prior to drawing the open end down to a 0.5 mm opening. The total surface area of such minerals as quartz and other silicates can be controlled through the average grain size.

Autocatalysis refers to the presence of catalytic feedback loops among a subset of catalytic species which as a result collectively catalyze the production of the molecular species of the subset. It is not necessary for any of the members of the autocatalytic subset to catalyze its own production (e.g. with DNA). All that is necessary is that each of the members catalyze the production of at least one other member of the subset; this is sufficient to ensure that each of the members of the subset will be members of at least one catalytic feedback loop including at least one other member of the autocatalytic subset.

In principle, autocatalysis could play only a minor role in the concentrations of the molecular species present in a given closed system at equilibrium conditions, at a given temperature and internal pressure. However, at a critical level of autocatalysis in a subset of molecular species, there will be a temporary exponential growth in the concentrations of the member species of the subset, with a potentially significant increase in the concentrations of the members. The catalytic efficiencies required for such a critical level of autocatalysis are relatively low. In a closed system of organic molecular species at elevated temperatures and pressures, a temperature-pressure region (or equivalently, temperature-concentration region) is expected with some stoichiometries, where such a critical level of autocatalysis will be present characterized by thermodynamic disequilibrium conditions, where previous exponential growth in molecular species concentrations occurred (see attached scientific article).

Figure 3:
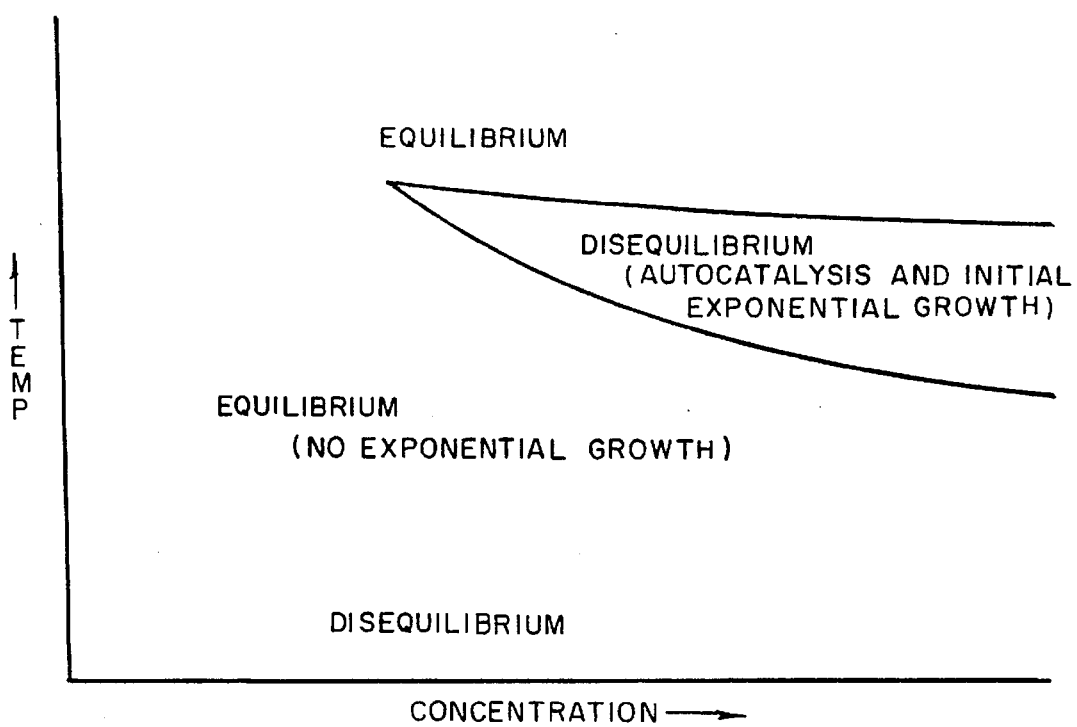
FIG. 3 is a phase diagram of regions of thermodynamic equilibrium and disequilibrium.

FIG. 3 provides a conceptual picture of the anticipated regions of equilibrium and disequilibrium in temperature—concentration space inside a closed system at fixed stoichiometry (where internal pressure could alternatively be used in place of concentration for the purposes of presenting the conceptual picture). Only a subset of stoichiometric ratios would presumably allow a region of disequilibrium (with temporary exponential growth) as shown in FIG. 3. Increasing temperature, all other things being equal, favors increases in concentration of complex organic molecules, improving the conditions for a critical level of autocatalytic activity (see attached scientific article).

At sufficiently low concentrations, as shown in FIG. 3, the disequilibrium region disappears, due to the reduced rate of reactions between molecules. At temperatures sufficiently high that bond residence times are of the order of times between collisions of molecular species, concentrations of organic molecules will necessarily decline with increasing temperature, with the result that the region of disequilibrium will also be bounded from above, as shown in FIG. 3.

Tests for equilibrium conditions in the final chemical assemblage (after cooling from elevated temperatures and pressures) are as follows:

- The final assemblage of molecular species depends only on the bulk stoichiometry of the starting materials (e.g. C:H:O:N) but not on the specific compositions of the starting material. This can be tested by using alternative mixtures of chemicals, e.g. of water, ethanol and nitric acid with the same stoichiometries as mixtures using water, methanol and concentrated ammonia solution.
- Lack of dependence of the molecular assemblage on time at temperature; "continuous" variation of concentrations with variation in temperature.

Tests for disequilibrium conditions are as follows:

- Concentrations of some molecular species will vary in a "discontinuous" fashion with temperature near the boundary of the autocatalytic region. This will show up in analyses as the seemingly discontinuous appearance of new molecular species (or a significant, "discontinuous" increase in concentration) above a certain critical temperature (and pressure).
- The concentrations of some molecular species will exhibit a tendency to change over time (i.e. when steady-state conditions might otherwise have been expected) at temperatures above the critical temperature.
- Some concentrations (e.g. non-catalysts) will not change in a discontinuous fashion at the critical temperature.
- The assemblage of molecular species present in the pressure vessel at a given elevated temperature (where sufficient time is allowed at the given temperature for steady-state at a given stoichiometry) will, contrary to equilibrium expectations, generally depend on the prior temperature history of the sample in the vessel.

Since a given sample run can obtain information at only one stoichiometry and temperature-pressure history, numerous runs at varying temperatures and stoichiometries must be conducted and compared, to obtain the above information.

FIG. 3 shows regions of thermodynamic equilibrium and disequilibrium in a conceptual phase diagram of temperature vs total concentration of molecular species in a closed system. Ratios of C:H:O:N and other elements are fixed in the system. Chemical disequilibrium among the molecular species at very low temperatures, as shown on the diagram, automatically results from low reaction rates relative to the timeframe of the observations.

The examples and embodiments described are exemplary only and not limiting. Many variations and modifications of the processes and methods described are within the scope of the invention. Accordingly, the scope of protection is not limited by the above description but only by the claims which follow, and that scope includes all equivalents of the subject matter of the claims.

The above procedure for production of an autocatalytic chemical system is not found in the open literature.

I claim:

1. A method of chemical synthesis, comprising:

providing, at elevated temperatures and pressures, a closed system including a sample of concentrations of organic compounds with a range of stoichiometries and chemical compositions of C:H:O:N and other elements to enable a critical level of overall autocatalytic activity among a subset of member molecular species of the organic compounds present at quasi steady-state conditions at said elevated temperature and pressure, further resulting in significant further increases in the concentrations of member molecular species of the autocatalytic subset, enabling the synthesis of compounds that were heretofore unknown, and/or were not readily synthesizable (or unsynthesizable) by existing techniques;

placing compounds selected from a group comprising water, methanol or ammonia in a pressure vessel and sealing it;

heating of said sealed pressure vessel at least a day at temperatures and internal pressures of at least 950° C. and at least 70 atmospheres respectively;

cooling the sample by alternative means comprising cooling in the furnace at zero electrical power; or removal of the sample from the furnace with subsequent cooling under room conditions; or venting of the gases in the pressure vessel near or at peak temperature into a chilled collection vessel; and determining the chemical composition and concentrations of the final synthesized compounds in the cooled pressure vessel by determining and comparing temperature and vessel internal pressure history (comprising peak temperature and internal pressure, time at temperature and rate of cooling); stoichiometries of initial solid, liquid and gaseous compounds in the pressure vessel; and use of external electrical fields during heating.

2. A method of chemical synthesis, comprising inserting starting substances (at least one of which contains carbon) with varied stoichiometries within a pressure vessel and sealing the pressure vessel, heating the pressure vessel, establishing temperature and pressure within the pressure vessel sufficient to establish autocatalytic effects, opening the pressure vessel and collecting formed product from the pressure vessel.

3. The method of claim 2, wherein the inserting, sealing, heating, and cooling, opening, admitting, and collecting and cooling steps further comprise inserting a sample in the pressure vessel, sealing the pressure vessel, enclosing the pressure vessel in a housing, providing an opening in the housing for accessing the pressure vessel, and heating the pressure vessel and the housing.

4. The method of claim 3, wherein the sealing of the pressure vessel comprises sealing a hole in an extended end of the pressure vessel.

5. The method of claim 4, wherein opening the pressure vessel comprises breaking off the extended end of the pressure vessel and breaking the seal from the opening in the pressure vessel.

6. The method of claim 2, further comprising pre-cooling a collector, admitting product from the vessel to the collector, and cooling and collecting the product in the collector.

7. The method of claim 2, further comprising pre-cooling a sample collector, inserting the sample collector in a sleeve, communicating a portion of the sample collector with the opening in the housing, opening the pressure vessel and venting product from the pressure vessel to the sample collector, cooling the product in the sample collector and analyzing the product.

8. The method of claim 7, further comprising holding liquid nitrogen in the sample collector, cooling the collector with the liquid nitrogen in the sample collector, and releasing nitrogen from the sample collector and preventing ingress of gases from the atmosphere.

9. The method of claim 8, wherein the pre-cooling further comprises pre-cooling the collector in a sleeve.

10. The method of claim 2, wherein the inserting comprises inserting a fluid through a fine opening in the pressure vessel and sealing an outer end of the fine opening.

11. The method of claim 10, wherein the opening comprises breaking the sealed outer end with a plunger.

12. The method of claim 2, wherein the opening comprises breaking a seal from the pressure vessel.

13. The method of claim 2, further comprising an initial step of evacuating the pressure vessel.

14. The method of claim 2, further comprising providing an additional effect of surface catalysis from an inner wall of the vessel and from surfaces of other catalytic solids in the vessel.

15. A method of chemical synthesis, comprising:

providing, at elevated temperatures and pressures, a closed system including a sample of concentrations of compounds with a range of stoichiometries and chemical compositions of carbon and other elements to enable a critical level of overall autocatalytic activity among a subset of member molecular species of the compounds present at said elevated temperatures and pressures, resulting in significant increases in the concentrations of member molecular species of the autocatalytic subset, enabling the synthesis of a new product that was heretofore unknown, and/or was not readily synthesizable (or unsynthesizable) by existing techniques;

placing the compounds in a pressure vessel and sealing the pressure vessel;

heating the sealed pressure vessel under pressure;

cooling the sample by alternative means comprising cooling the pressure vessel in a furnace at zero electrical power; or removal of the product from the pressure vessel with subsequent cooling of the product under room conditions; or venting product gases from the pressure vessel near or at peak temperature into a chilled collection vessel; and influencing chemical composition and concentrations of the synthesized product in the cooled pressure vessel by controlling and comparing temperature and vessel internal pressure change, peak temperature and peak internal pressure, time at temperature, rate of cooling and stoichiometric of initial compounds in the pressure vessel.

16. The method of claim 15, further comprising surrounding the pressure vessel with a housing and heating the pressure vessel and the housing, and further comprising providing an opening in the housing for access to the pressure vessel for opening the pressure vessel.

17. The method of claim 16, further comprising providing an extension on the pressure vessel which extends through the opening in the housing, and providing a fine passageway in the extension and filling the vessel through the passageway and sealing the passageway, and wherein the subsequent opening of the pressure vessel after heating and pressurizing comprises opening of the passageway.

18. The method of claim 17, further comprising surrounding the extension and the opening in the housing with a sleeve, mounting a plunger on the sleeve and allowing the plunger within an end of the extension for breaking the end of the extension and thereby opening the pressure vessel.

19. The method of claim 15, further comprising initially placing solid crystalline materials in the pressure vessel.

20. The method of claim 15, further comprising applying to the pressure vessel external electrical fields during heating.

* * * * *